(12) United States Patent
Ahn et al.

(10) Patent No.: US 9,846,497 B2
(45) Date of Patent: Dec. 19, 2017

(54) STYLUS COMPRISING SIGNAL GENERATORS TO ADJUST AMPLITUDE RATIO, PRESSURE DETECTING SYSTEM AND DRIVING METHOD THEREOF

(71) Applicant: Samsung Display Co., Ltd., Yongin-si, Gyeonggi-do (KR)

(72) Inventors: Soon-Sung Ahn, Yongin-si (KR); Hyoung-Wook Jang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/348,870

(22) Filed: Nov. 10, 2016

(65) Prior Publication Data
US 2017/0123518 A1 May 4, 2017

Related U.S. Application Data

(63) Continuation of application No. 13/672,321, filed on Nov. 8, 2012, now abandoned.

(30) Foreign Application Priority Data

Mar. 26, 2012 (KR) ........................ 10-2012-0030587

(51) Int. Cl.
G06F 3/0354 (2013.01)
G06F 3/038 (2013.01)
G06F 3/041 (2006.01)

(52) U.S. Cl.
CPC ........ *G06F 3/0383* (2013.01); *G06F 3/03545* (2013.01); *G06F 3/0416* (2013.01); *G06F 2203/04105* (2013.01)

(58) Field of Classification Search
CPC ...... G06F 3/0317; G06F 3/0321; G06F 3/033; G06F 3/03545; G06F 3/03546; G06F 3/046

See application file for complete search history.

(56) References Cited

U.S. PATENT DOCUMENTS

| 5,369,227 A | 11/1994 | Stone |
| 2001/0006383 A1 | 7/2001 | Fleck et al. |
| 2006/0007164 A1 | 1/2006 | Liu et al. |
| 2008/0055279 A1 | 3/2008 | Osada et al. |

(Continued)

FOREIGN PATENT DOCUMENTS

| CN | 201259668 Y | 6/2009 |
| CN | 102122216 A | 7/2011 |

(Continued)

OTHER PUBLICATIONS

Japanese Office action for Patent Application No. 2012-139626, dated Jan. 7, 2014, (3 pages).

(Continued)

*Primary Examiner* — Sanghyuk Park
(74) *Attorney, Agent, or Firm* — Lewis Roca Rothgerber Christie LLP

(57) ABSTRACT

A stylus includes a pressure detector for detecting applied pressure, a first signal generator for generating a signal of a first frequency, a second signal generator for generating a signal of a second frequency, and a controller for adjusting at least one of the first and second signal generators to control an amplitude ratio of the signal of the first frequency to the signal of the second frequency according to the applied pressure detected by the pressure detector.

16 Claims, 5 Drawing Sheets

(56) References Cited

U.S. PATENT DOCUMENTS

| | | |
|---|---|---|
| 2010/0051356 A1 | 3/2010 | Stern et al. |
| 2010/0085325 A1 | 4/2010 | King-Smith et al. |
| 2010/0263945 A1 | 10/2010 | Mao et al. |
| 2011/0155479 A1 | 6/2011 | Oda et al. |
| 2011/0169775 A1 | 7/2011 | Liaw et al. |
| 2011/0193776 A1 | 8/2011 | Oda et al. |
| 2011/0193825 A1 | 8/2011 | Yeh et al. |
| 2012/0037433 A1 | 2/2012 | Yeh et al. |
| 2013/0088465 A1 | 4/2013 | Geller et al. |

FOREIGN PATENT DOCUMENTS

| | | |
|---|---|---|
| EP | O0967566 A2 | 12/1999 |
| JP | 07-325658 | 12/1995 |
| JP | 2001-282444 | 10/2001 |
| JP | 2003-266994 | 9/2003 |
| JP | 2006-509268 | 3/2006 |
| JP | 2011-138180 A | 7/2011 |
| KR | 1997-0016902 | 4/1997 |
| KR | 2000-0006367 | 1/2000 |
| KR | 10-2010-0038067 | 4/2010 |
| KR | 10-2011-0074652 | 7/2011 |
| TW | 201039109 A | 11/2010 |
| WO | WO 2011/154950 A1 | 12/2011 |

OTHER PUBLICATIONS

JPO Decision of Grant dated Apr. 15, 2014, for corresponding Japanese Patent application 2012-139626, (3 pages).

KIPO Notice of Allowance dated Jun. 26, 2013, for Korean priority Patent application 102012-0030587, (1 page).

Patent Abstract of Japan Publication No. 09-244786 corresponding to KR 1997-0016902 listed above.

SIPO Office action dated Sep. 6, 2015, with English translation, for corresponding Chinese Patent application 201210387252.5, (14 pages).

Taiwan Office action dated Nov. 18, 2014, for corresponding Taiwanese Patent application 101144454, (5 pages).

Taiwanese Patent Gazette dated Nov. 21, 2015, for corresponding Taiwan Patent application 101144454, (26 pages).

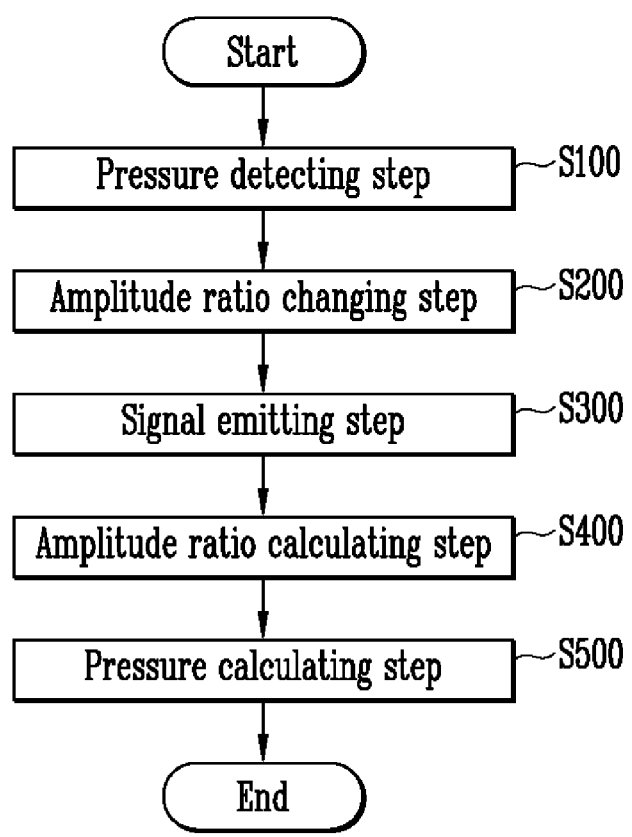

STYLUS COMPRISING SIGNAL GENERATORS TO ADJUST AMPLITUDE RATIO, PRESSURE DETECTING SYSTEM AND DRIVING METHOD THEREOF

CROSS-REFERENCE TO RELATED APPLICATION

This application is a divisional of U.S. patent application Ser. No. 13/672,321, filed Nov. 8, 2012, which claims priority to and the benefit of Korean Patent Application No. 10-2012-0030587, filed Mar. 26, 2012, the entire content of both of which is incorporated herein by reference.

BACKGROUND

1. Field

Embodiments of the present invention relate to a stylus, and to a pressure detecting system including a stylus and a driving method thereof.

2. Description of Related Art

Recently, a digitizer, a touch screen, or the like, which is capable of replacing a conventional input device such as a keyboard and a mouse, and which is capable of directly detecting a position contacted by a human's hand or an object, has been widely used. In addition, the use of a stylus system capable of performing more elaborate, or more accurate, input (as compared to a system using the human hand) tends to increase.

To perform various operations corresponding to writing pressure of the stylus acting on the digitizer (for example, a control of a thickness of a line drawn by the stylus), desire for detection of the writing pressure of the stylus has increased. To this end, according to the related art, a technology wherein a change in frequency of a signal emitted from the stylus corresponding to a change in pressure of the stylus, and detection of the changed frequency to sense the writing pressure of the stylus, has been used.

However, because the frequency of the signal emitted from the stylus is continuously changed, a frequency detection operation (for example, Fast Fourier transform, or the like) is repeatedly performed, thereby increasing a processing time and complicating a hardware configuration.

SUMMARY

An aspect of embodiments of the present invention provides a stylus, a pressure detecting system capable of detecting writing pressure of the stylus without changing a frequency of the signal emitted from the stylus, and a driving method thereof.

According to an exemplary embodiment of the present invention, there is provided a stylus including a pressure detector for detecting applied pressure, a first signal generator for generating a signal of a first frequency, a second signal generator for generating a signal of a second frequency, and a controller for adjusting at least one of the first and second signal generators to control an amplitude ratio of the signal of the first frequency to the signal of the second frequency according to the applied pressure detected by the pressure detector.

The first frequency and the second frequency may be different from each other.

The first and second signal generators may be respectively configured to emit the signals of the first and second frequencies through a single signal emitter.

The first signal generator and the second signal generator may respectively emit the signal of the first frequency and the signal of the second frequency through different signal emitters.

The controller might be configured to change an amplitude of only one of the signals of the first and second frequencies to control the amplitude ratio of the signals of the first and second frequencies.

The controller may be configured to change both an amplitude of the signal of the first frequency and an amplitude of the signal of the second frequency to control the amplitude ratio of the signals of the first and second frequencies.

According to another exemplary embodiment of the present invention, there is provided a pressure detecting system including a stylus including a pressure detector for detecting applied pressure, a first signal generator for generating a signal of a first frequency, a second signal generator for generating a signal of a second frequency, and a controller for adjusting at least one of the first and second signal generators to control an amplitude ratio of the signal of the first frequency to the signal of the second frequency according to the applied pressure detected by the pressure detector, and a pressure detecting apparatus for receiving the signals of the first and second frequencies from the stylus, and for detecting the applied pressure according to the amplitude ratio of the signal of the first frequency to the signal of the second frequency.

The first frequency and the second frequency may be different from each other.

The first signal generator and the second signal generator may respectively emit the signal of the first frequency and the signal of the second frequency through a single signal emitter.

The first signal generator and the second signal generator may respectively emit the signal of the first frequency and the signal of the second frequency through different signal emitters.

The controller might be configured to change an amplitude of only one of the signals of the first and second frequencies to control the amplitude ratio of the signals.

The controller may be configured to change both the amplitude of the signal of the first frequency and the amplitude of the signal of the second frequency to control the amplitude ratio of the signals.

According to still another exemplary embodiment of the present invention, there is provided a driving method of a pressure detecting system, the method including detecting applied pressure, controlling an amplitude ratio of a signal of a first frequency to a signal of a second frequency according to the detected applied pressure, emitting the signal of the first frequency and the signal of the second frequency, receiving the signal of the first frequency and the signal of the second frequency, calculating the amplitude ratio of the signal of the first frequency to the signal of the second frequency, and calculating the pressure from the calculated amplitude ratio.

The first frequency and the second frequency may be different from each other.

Controlling the amplitude ratio might include changing an amplitude of only one of the signals of the first and second frequencies to control the amplitude ratio of the signals.

Controlling the amplitude ratio may include changing both an amplitude of the signal of the first frequency and an amplitude of the signal of the second frequency to control the amplitude ratio of the signals.

BRIEF DESCRIPTION OF THE DRAWINGS

The accompanying drawings, together with the specification, illustrate exemplary embodiments of the present invention, and, together with the description, serve to explain aspects of embodiments of the present invention.

FIG. 6 is a flow chart showing a driving method of a pressure detecting system according to an exemplary embodiment of the present invention.

DETAILED DESCRIPTION

Figure 1:
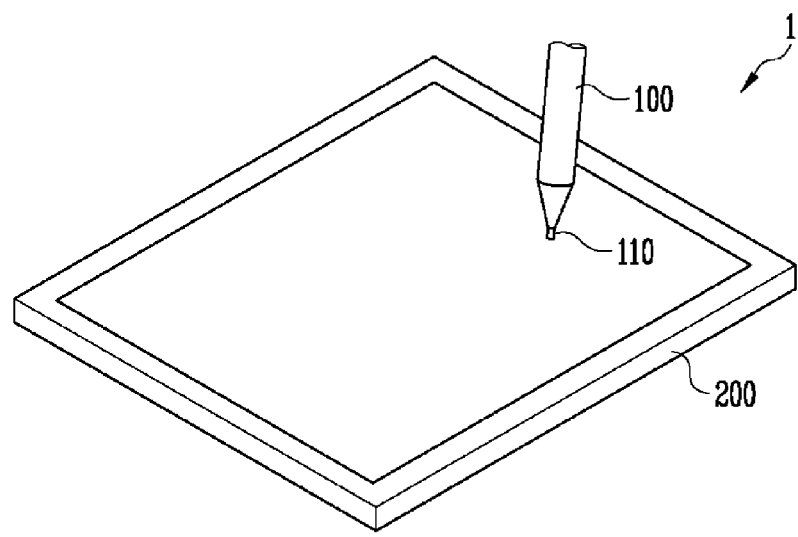
FIG. 1 is a diagram showing a pressure detecting system according to an exemplary embodiment of the present invention.

Hereinafter, certain exemplary embodiments of the present invention will be described with reference to the accompanying drawings. When a first element is described as being coupled to a second element, the first element may be directly coupled to the second element, or may be indirectly coupled to the second element via one or more other elements. Further, some elements that are not essential to the complete understanding of the embodiments of the present invention are omitted for clarity. Also, like reference numerals refer to like elements throughout.

Specific matters of other exemplary embodiments will be included in the detailed description and the accompanying drawings. Aspects of embodiments of the present invention, and methods to achieve such aspects, will be elucidated from exemplary embodiments described below in detail with reference to the accompanying drawings. However, the present invention is not limited to the exemplary embodiments disclosed below, but may be implemented in various different forms. Further, in the accompanying drawings, portions unrelated to the described embodiments of the present invention may be omitted to improve a description of the embodiments of the present invention, and same reference numerals will be used to describe same or similar portions throughout the present specification.

Hereinafter, a stylus, a pressure detecting system, and a driving method thereof will be described with reference to exemplary embodiments of the present invention, and to drawings for describing the exemplary embodiments.

FIG. 1 is a diagram showing a pressure detecting system according to an exemplary embodiment of the present invention. Referring to FIG. 1, the pressure detecting system 1 according to the present embodiment of the present invention includes a stylus 100 and a pressure detecting apparatus 200.

The stylus 100 is a device capable of being used to input information by contact with the pressure detecting apparatus, the stylus 100 being used in lieu of a user's hand. In addition, the stylus 100 may change an amplitude ratio of two signals emitted from the stylus 100 to enable writing pressure of the stylus 100 to be detected by the pressure detecting apparatus 200.

The pressure detecting apparatus 200 may be, for example, a digitizer or a touch screen capable of recognizing information corresponding to an inuput (e.g., a predetermined input operation) by the stylus 100, and detecting a position(s) contacted by the stylus 100 according to a resistive scheme, a capacitive scheme, or the like. In addition, the pressure detecting apparatus 200 may detect the writing pressure of the stylus 100 (e.g., pressure between the stylus and the surface of the pressure detecting apparatus) from the amplitude ratio of the two signals emitted from the stylus 100.

Aspects of the present embodiment are characterized by the sensing of the writing pressure of the stylus 100. Therefore, details of the stylus 100 and the pressure detecting apparatus 200 of the present embodiment will be described below.

Figure 2:
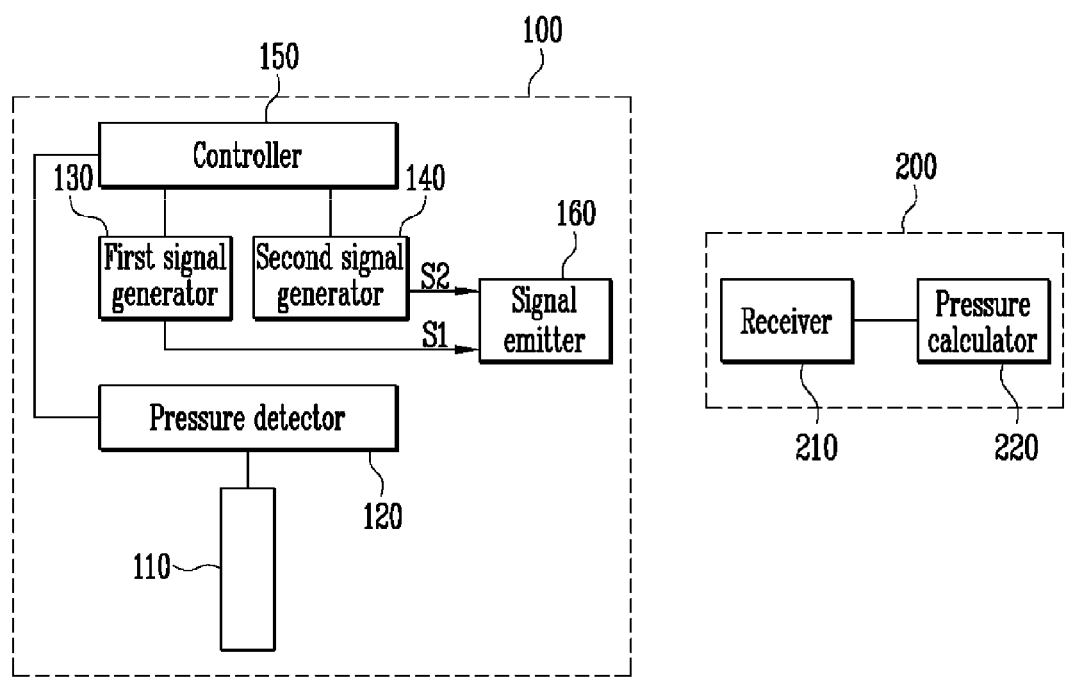
FIG. 2 is a block diagram showing a configuration of a pressure detecting system according to an exemplary embodiment of the present invention.

FIG. 2 is a block diagram showing a pressure detecting system according to an exemplary embodiment of the present invention. Referring to FIG. 2, a stylus 100 according to the present embodiment may include a pressure detector 120, a first signal generator 130, a second signal generator 140, and a controller 150.

The pressure detector 120 may detect pressure applied to the stylus 100. For example, the pressure detector 120 may detect pressure applied to a tip 110 of the stylus 100 according to a user's writing operation, or according to a user's manipulation of the stylus. The tip 110 may be coupled to the pressure detector 120 to transfer pressure generated in, or exerted on, the tip 110 to the pressure detector 120. The tip 110, which is a part capable of contacting the pressure detecting apparatus 100, may protrude from one end of the stylus 100.

Although FIG. 2 shows the pressure detector 120 is configured to detect the pressure applied to the tip 110 as described above, the pressure detector 120 may detect other kinds of externally applied pressure to, or on, the stylus 100, in addition to the pressure applied through the tip 110. For example, the pressure detector 120 may detect a strength of a user's grip on the stylus 100. Therefore, the user controls the strength of the user's hand gripping the stylus 100, thereby making it possible to control functions (e.g., a line thickness, a color change, etc.) of the stylus (e.g., by squeezing the stylus 100 harder). In this case, for example, the pressure detector 120 may include a variable capacitor having a capacitance changed by the pressure applied to the stylus 100. In addition, the pressure detector 120 may include a variable coil, or a variable resistance (e.g., a variable resistive element), or may include a resonance circuit having at least one of the variable capacitor, the variable coil, or the variable resistance.

The first signal generator 130 may generate a signal S1 of a first frequency, and may change an amplitude of the signal S1 of the first frequency according to control of the controller 150.

The second signal generator 140 may generate a signal S2 of a second frequency, and may change an amplitude of the signal S2 of the second frequency according to the control of the controller 150.

Each of the first and second signal generators 130 and 140 may generate a signal having a fixed frequency, and may emit the signal S1 of the first frequency and the signal S2 of the second frequency to the outside (e.g., may externally emit the signals S1 and S2) via a signal emitter (e.g., a single signal emitter) 160. Therefore, a separate component for changing the frequency may be omitted from within the first and second signal generators 130 and 140. In addition, the first and second frequencies may be different frequencies.

The controller 150 controls the first signal generator 130 and/or the second signal generator 140 corresponding to the pressure detected through the pressure detector 120, thereby making it possible to control an amplitude ratio between the signal S1 of the first frequency and the signal S2 of the second frequency. In the present embodiment, the controller 150 may change the amplitudes of the signal S1 of the first frequency and/or the signal S2 of the second frequency to have an amplitude ratio corresponding to the pressure detected through the pressure detector 120 with reference to a separate lookup table, an equation, or the like.

The pressure detecting apparatus 200 may receive the signal S1 of the first frequency and the signal S2 of the second frequency emitted from the stylus 100, and may calculate the pressure applied to the stylus 100 from the amplitude ratio of the signals S1 and S2. Accordingly, the pressure detecting apparatus 200 may include a receiver 210 and a pressure calculator 220.

The receiver 210 may receive the signal S1 of the first frequency and the signal S2 of the second frequency, which are emitted from the signal emitter 160 of the stylus 100.

The pressure calculator 220 calculates the amplitude ratio of the signal S1 of the first frequency to the signal S2 of the second frequency received by the receiver 210, and inversely transforms the calculated amplitude ratio, thereby making it possible to calculate the pressure applied to the stylus 100. In the present embodiment, the pressure calculator 220 may refer to the separate lookup table or the equation (or may refer to a different lookup table or equation) similar to the controller 150 of the stylus 100.

In addition, the pressure calculator 220 may include filters suitable or optimized for signals of the first frequency and the second frequency to divide the signal received by the receiver 210 into the signal S1 of the first frequency and the signal S2 of the second frequency. Therefore, the writing pressure of the stylus 100 may be detected by changing only the amplitude of the signals S1 and S2 having the fixed frequencies, and without performing a complicated process of changing the frequency of the signal.

Figure 3A:
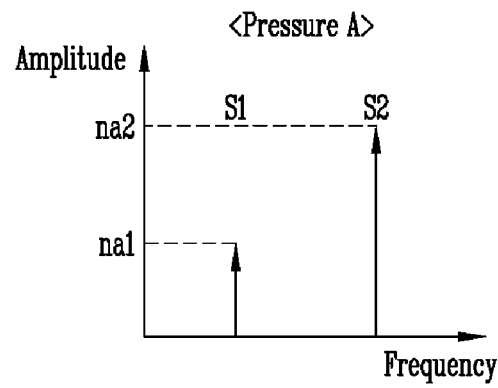
FIGS. 3A to 4C are graphs showing an operation of controlling an amplitude ratio of two signals corresponding to pressure applied to a tip of a stylus according to an embodiment of the present invention.
Figure 3B:
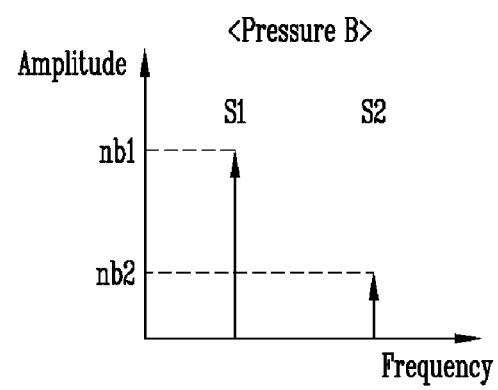
Figure 3C:
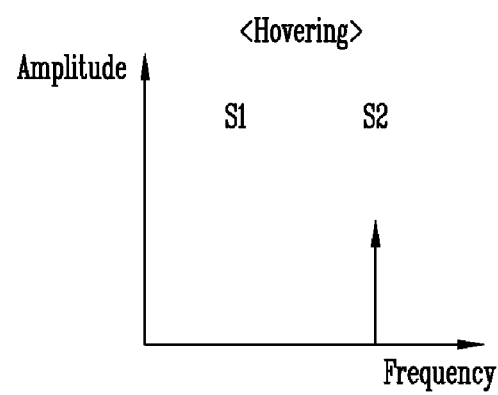
Figure 4A:
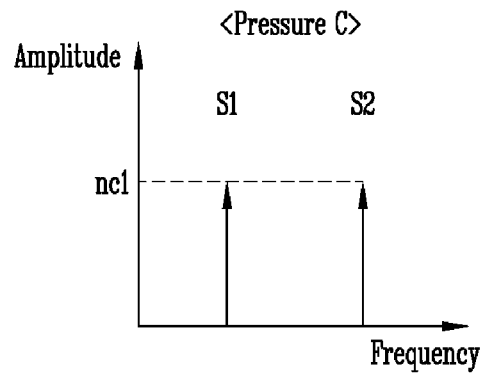
Figure 4B:
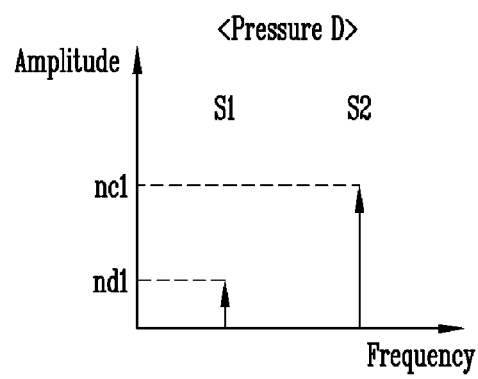
Figure 4C:
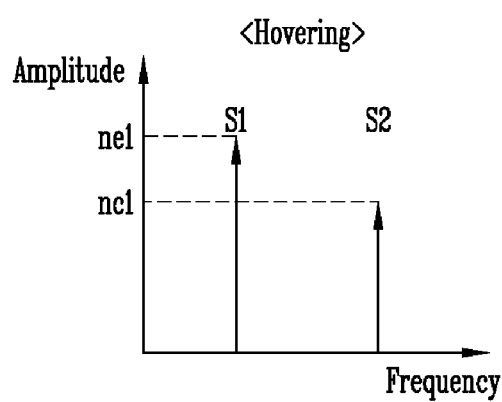

FIGS. 3A to 4C are graphs showing an operation of controlling an amplitude ratio of two signals according to pressure applied to a tip of a stylus according to an embodiment of the present invention. FIGS. 3A to 3C show an operation of controlling an amplitude ratio of the signals S1 and S2 by changing both of the amplitudes of the signals S1 and S2 of the first and second frequencies, and FIGS. 4A and 4C show an operation of controlling an amplitude ratio of the signals S1 and S2 by changing the amplitude of the signal S1 of the first frequency, while fixing, or not changing, the amplitude of the signal S2 of the second frequency.

Referring to FIG. 3A, when the pressure applied to the tip 110 of the stylus 100 is detected as 'A,'' and when an amplitude ratio corresponding to the pressure 'A' is set to be 'a1:a2,' the controller 150 may control the signal S1 of the first frequency and the signal S2 of the second frequency to respectively be 'na1' and 'na2.' Therefore, the pressure detecting apparatus 200 receiving the signal S1 of the first frequency having an amplitude of 'na1' and the signal S2 of the second frequency having an amplitude of 'na2' may calculate an amplitude ratio ('a1:a2') of the signals S1 and S2, and may inversely calculate the 'Pressure A' applied to the tip 110 from the calculated amplitude ratio.

In addition, referring to FIG. 3B, in the case in which the pressure applied to the tip 110 of the stylus 100 is changed from 'A' to 'B,' and when the amplitude ratio corresponding to the 'Pressure B' is set to be 'b1:b2,' the controller 150 may change the amplitudes of the signal S1 of the first frequency and the signal S2 of the second frequency to respectively be 'nb1' and 'nb2.' Therefore, the pressure detecting apparatus 200 receiving the signal S1 of the first frequency having the amplitude of 'nb1' and the signal S2 of the second frequency having the amplitude of 'nb2' may calculate an amplitude ratio ('b1:b2') of the signals S1 and S2, and may inversely calculate the 'Pressure B' applied to the tip 110 from the calculated amplitude ratio.

Further, referring to FIG. 3C, when the stylus 100 is spaced apart from, or not in contact with, the pressure detecting apparatus 200, that is, when the stylus 100 is in a 'Hovering' state, the controller 150 may set the amplitude of the signal S1 of the first frequency to be '0.' That is, the generation of the signal S1 of the first frequency may be stopped such that only the signal S2 of the second frequency is transferred to the pressure detecting apparatus 200. Therefore, a situation where the pressure detecting apparatus 200 is receiving only the signal S2 of the second frequency may indicate that the stylus 100 is in the hovering state.

Referring to FIG. 4A, when the pressure applied to the tip 110 of the stylus 100 is detected as 'C,' and when an amplitude ratio corresponding to the 'Pressure C' is set to be '1:1,' the controller 150 may control amplitudes of the signal S1 of the first frequency and the signal S2 of the second frequency to be the same as each other. Because the amplitude of the signal S2 of the second frequency is fixed at, for example, 'nc1,' the controller 150 might control only the amplitude of the signal S1 of the first frequency to be 'nc1.' Therefore, the pressure detecting apparatus 200 receiving the signals S1 and S2 of the first and second frequencies having the same amplitude of 'nc1' may calculate an amplitude ratio ('1:1') of the signals S1 and S2, and may inversely calculate the 'Pressure C' applied to the tip 110 from the calculated amplitude ratio.

Referring to FIG. 4B, when the pressure applied to the tip 110 of the stylus 100 is changed from 'C to D,' and when an amplitude ratio corresponding to the 'Pressure D' is set to be 'd1:c1,' the amplitude of the signal S2 of the second frequency is fixed at, or set to, 'nc1.' Therefore, the controller 150 might control only the amplitude of the signal S1 of the first frequency to be 'nd1.' Therefore, the pressure detecting apparatus 200 receiving the signal S1 of the first frequency having the amplitude of 'nd1' and the signal S2 of the second frequency having the amplitude of 'nc1' may calculate an amplitude ratio ('d1:c1') of the signals S1 and S2, and may inversely calculate the pressure 'D' applied to the tip 110 from the calculated amplitude ratio.

Referring to FIG. 4C, when the pressure applied to the tip 110 of the stylus 100 is changed from 'C' to '0' (that is, when the stylus 100 is changed to the 'Hovering' state), and when an amplitude ratio corresponding to the pressure '0' is set to be 'e1:c1,' the amplitude of the signal S2 of the second frequency may be fixed at 'nc1.' Therefore, the controller 150 might control, or change, only the amplitude of the signal S1 of the first frequency to be 'ne1.' Therefore, the pressure detecting apparatus 200 receiving the signal S1 of the first frequency having the amplitude of 'ne1' and the signal S2 of the second frequency having the amplitude of 'nc1' may calculate an amplitude ratio ('e1:c1') of the signals S1 and S2, and may inversely calculate the pressure '0' applied to the tip 110 from the calculated amplitude ratio. Because only the amplitude of any one of the signal S1 of the first frequency and the signal S2 of the second frequency is changed, a hardware configuration may be simplified as compared to changing the amplitudes of both of the signals S1 and S2.

Figure 5:
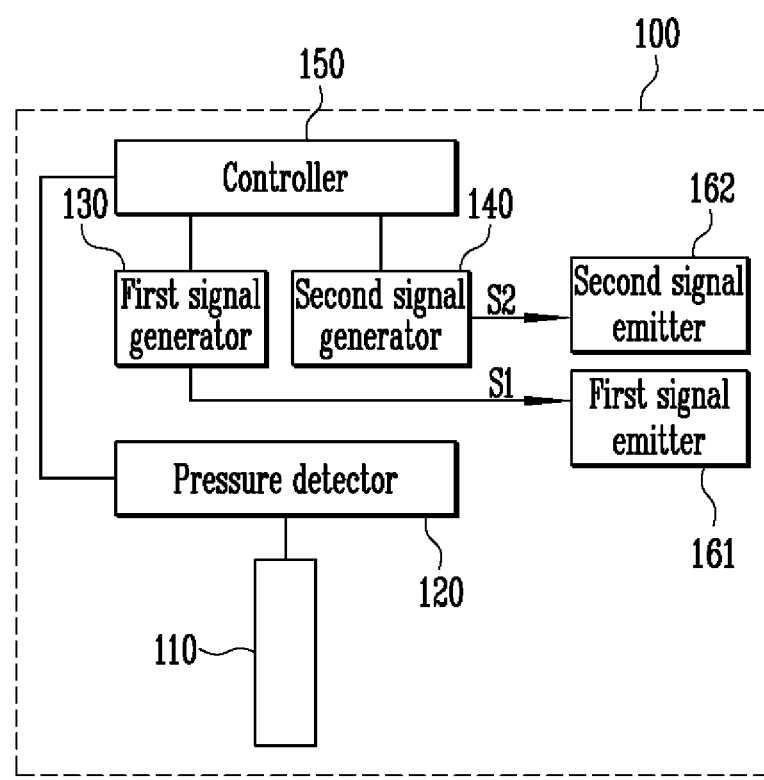
FIG. 5 is a block diagram showing a stylus according to another exemplary embodiment of the present invention.

FIG. 5 is a diagram showing a stylus according to another exemplary embodiment of the present invention. Referring to FIG. 5, the stylus 200 according to another exemplary embodiment may be configured to include a first signal emitter 161 and a second signal emitter 162. Therefore, the first and second signal generators 130 and 140 may respectively externally emit a signal S1 of a first frequency and a signal S2 of a second frequency through different signal emitters 161 and 162. For example, the first signal generator 130 may externally emit the signal S1 of the first frequency through the first signal emitter 161, and the second signal generator 140 may externally emit the signal S2 of the second frequency through the second signal emitter 162.

Only differences between a configuration of the present embodiment from that of the above-mentioned exemplary embodiment have been described, and description of similarities of the two embodiments is omitted.

FIG. 6 is a flow chart showing a driving method of a pressure detecting system according to an exemplary embodiment of the present invention. Referring to FIG. 6, the driving method of the pressure detecting system according to the present exemplary embodiment of the present invention includes a pressure detecting step (S100); an amplitude ratio changing step (S200); a signal emitting step (S300), an amplitude ratio calculating step (S400), and a pressure calculating step (S500).

In the pressure detecting step (S100), pressure applied to the stylus 100 is detected. In the present embodiment, pressure applied to the tip 110 of the stylus 100 may be detected, and/or pressure applied by grip strength of a hand gripping the stylus 100 may be detected. Further, the pressure applied to the stylus 100 may be calculated through the pressure detector 120 including a variable capacitor, or the like.

In the amplitude ratio changing step (S200), an amplitude ratio of a signal S1 of a first frequency to a signal S2 of a second frequency is changed in a manner corresponding to the pressure detected in the pressure detecting step (S100). In the present embodiment, the amplitude ratio of the signals S1 and S2 may be controlled by changing any one of the signals S1 and S2 or by changing both of the signals S1 and S2. In addition, the first and second frequencies of the signals S1 and S2 may be different from each other.

In the signal emitting step (S300), the signal S1 of the first frequency and the signal S2 of the second frequency may be externally emitted. Here, the signal S1 of the first frequency and the signal S2 of the second frequency may be externally emitted via a single signal emitter 160 (as shown in FIG. 2), or may be emitted through different signal emitters 161 and 162 (as shown in FIG. 5).

In the amplitude ratio calculating step (S400), the amplitude ratio of the signal S1 of the first frequency to the signal S2 of the second frequency, which are received in the pressure detecting apparatus 200, may be calculated.

In the pressure calculating step (S500), the pressure applied to the stylus 100 may be calculated using the amplitude ratio calculated in the amplitude calculating step (S400).

As set forth above, according to exemplary embodiments of the present invention, the stylus, the pressure detecting system for detecting writing pressure of the stylus without changing the frequency of the signal emitted from the stylus, and the driving method thereof, may be provided.

While embodiments of the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A stylus comprising:
a pressure detector for detecting applied pressure;
a first signal generator for generating a first signal of a first frequency;
a second signal generator for generating a second signal of a second frequency; and
a controller for controlling both of the first and second signal generators to adjust an amplitude ratio of the first and second signals according to the applied pressure detected by the pressure detector,
wherein the controller is configured to change both an amplitude of the first and second signals to adjust the amplitude ratio, and
the controller is configured to adjust the amplitude ratio to 0 when the stylus is in a hovering state.

2. The stylus according to claim 1, wherein the first frequency and the second frequency are different from each other.

3. The stylus according to claim 1, wherein the first and second signal generators are respectively configured to emit the first and second signals through a single signal emitter.

4. The stylus according to claim 1, wherein the first signal generator and the second signal generator respectively emit the first and second signals through different signal emitters.

5. The stylus according to claim 1, wherein the first frequency and the second frequency are fixed frequencies.

6. The stylus according to claim 1, wherein the amplitude ratio is determined only according to the applied pressure detected by the pressure detector.

7. A pressure detecting system comprising:
a stylus comprising:
a pressure detector for detecting applied pressure;
a first signal generator for generating a first signal of a first frequency;
a second signal generator for generating a second signal of a second frequency; and
a controller for controlling both of the first and second signal generators to adjust an amplitude ratio of the first and second signals according to the applied pressure detected by the pressure detector; and
a pressure detecting apparatus for receiving the first and second signals from the stylus, and for detecting the applied pressure according to the amplitude ratio of the first and second signals,
wherein the controller is configured to change both an amplitude of the first and second signals to adjust the amplitude ratio, and
the controller is configured to adjust the amplitude ratio to 0 when the stylus is in a hovering state.

8. The pressure detecting system according to claim 7, wherein the first frequency and the second frequency are different from each other.

9. The pressure detecting system according to claim 7, wherein the first signal generator and the second signal generator respectively emit the first and second signals through a single signal emitter.

10. The pressure detecting system according to claim 7, wherein the first signal generator and the second signal generator respectively emit the first and second signals through different signal emitters.

11. The pressure detecting system according to claim 7, wherein the first frequency and the second frequency are fixed frequencies.

12. The pressure detecting system according to claim 7, wherein the amplitude ratio is determined only according to the applied pressure detected by the pressure detector.

13. A driving method of a pressure detecting system, the driving method comprising:
   detecting applied pressure by a pressure detector;
   controlling an amplitude ratio of a first signal of a first frequency and a second signal of a second frequency according to the applied pressure by a controller;
   emitting the first signal and the second signal;
   receiving the first and second signals;
   calculating the amplitude ratio of the first and second signals; and
   calculating the pressure from the calculated amplitude ratio,
   wherein controlling the amplitude ratio comprises changing both an amplitude of the first and second signals to adjust the amplitude ratio, and
   the controller is configured to adjust the amplitude ratio to 0 when the applied pressure is 0.

14. The method of claim 13, wherein the first frequency and the second frequency are different from each other.

15. The method of claim 13, wherein the first frequency and the second frequency are fixed frequencies.

16. The method of claim 13, wherein the amplitude ratio is determined only according to the applied pressure detected by the pressure detector.

* * * * *